United States Patent [19]

Edging

[11] Patent Number: 4,500,557
[45] Date of Patent: Feb. 19, 1985

[54] LEAVENING ACID COMPOSITION

[75] Inventor: Thomas E. Edging, Nashville, Tenn.

[73] Assignee: Stauffer Chemical Company, Westport, Conn.

[21] Appl. No.: 340,133

[22] Filed: Jan. 18, 1982

[51] Int. Cl.$^3$ .......................... A21D 2/00; C01B 15/16
[52] U.S. Cl. .................................... 426/563; 426/653; 423/306
[58] Field of Search ............... 426/551, 563, 653, 128; 423/267, 268, 306

[56] References Cited

U.S. PATENT DOCUMENTS 2,957,750  10/1960  Knox, Jr. ............................ 423/267
4,230,730  10/1980  Lauck ................................. 426/128

Primary Examiner—Raymond Jones
Assistant Examiner—Elizabeth A. King
Attorney, Agent, or Firm—Paul J. Juettner

[57] ABSTRACT

A new leavening acid composition characterized by a slow reaction rate is provided comprising a heat treated potassium modified 1:3:8 sodium aluminum phosphate such that the L.O.I. (loss on ignition) ranges between about 11 and about 14 and such that the leavening acid has a neutralizing value above 90. The leavening action of the new leavening acid is slower than non-heat treated SALP. The compositions are useful in leavening baked goods and especially refrigerated canned biscuits, pancakes and cakes.

16 Claims, No Drawings

LEAVENING ACID COMPOSITION

The present invention relates to an improved leavening acid composition for use in baked goods and particularly for use in refrigerated canned dough compositions and pancakes.

BACKGROUND OF THE PRESENT INVENTION

Refrigerated canned doughs are generally compositions packaged in foil surfaced fiber containers having vent holes or other means to allow gas to escape therefrom (U.S. Pat. Nos. 1,811,772 and 2,478,618). As the dough is proofed in the container, carbon dioxide is generated from the leavening system which expands the dough in the container and drives out the oxygen. The expanded dough seals the container. An internal gas pressure is required to maintain the seal and to keep the oxygen out of the container. The gas pressure must remain after refrigeration to maintain the seal. Failure to maintain the pressure will cause the dough to spoil due to bacteriological action which can spoil the biscuits and, in some instances, cause excessive gas pressure to be generated sufficient to cause the containers to rupture. The dough must also retain sufficient leavening to allow the product to rise when baked.

The leavening systems used in refrigerated canned doughs must be specifically adapted to satisfy certain criteria. The leavening system must develop gas at a slow enough rate initially to allow for mixing and handling. If too much gas is released during mixing, not enough will remain for sealing of the container (proofing). If a large amount of gas is generated after mixing but before the dough is placed in the can, the dough can puff causing problems in putting the proper dough weight into the container. After proofing, the containers must retain the internal pressure. Some leavening systems have been known to not maintain the pressure within the container upon refrigeration. In some commercial establishments, up to 40% of the dough, i.e. that left after cutting, is recycled requiring control of the leavening. In essence, the leavening system must provide the right amount of gas at various times from mixing to final baking.

Sodium acid pyrophosphate (hereinafter SAPP) has been found to be especially well suited to the needs of preleavened packaged doughs and is widely used for that purpose. The addition of minor amounts of $K^+$, $Ca^{++}$, and $Al^{+++}$ to the SAPP during manufacture permits the controlled retardation of the rate of reaction of the SAPP with the sodium bicarbonate in the baking system (Phosphorus, A.D.F. Toy, Comprehensive Inorganic Chemistry, Vol. 2, Chapter 20, 1973). A SAPP/bicarbonate leavening system fulfills the gas generation requirements for canned doughs.

However, the so-called "pyro" taste generally is considered objectionable.

The so-called "pyro" taste has been described as (1) a sensation that there is a coating on the roof of the mouth, (2) an astringent aftertaste and (3) a dry feeling that persists on the teeth for several minutes. It would be desirable to reduce the quantity of "pyro" used while maintaining the effective leavening properties which the pyrophosphate provides.

Also, the sodium acid pyrophosphate is only sufficiently slow for use in preparing refrigerated doughs if a mixing temperature about 18°–21° C. (65°–70° F.) is maintained in the mixing bowl. This is accomplished by pumping a refrigerated liquid through a jacketed mixing bowl. Avoidance of the requirement to maintain the mixing temperature within a limited range would be a desirable improvement. Also, recycle of the dough is not facilitated by this requirement.

Another well known leavening agent in the baking industry is sodium aluminum phosphate (hereafter SALP). It finds use in baking powders, self-rising mixes, preleavened pancake flours and mixes, prepared biscuit mixes, and prepared cake mixes. (See U.S. Pat. Nos. 2,550,491, 3,109,738, 3,041,177, 3,096,178).

Crystalline sodium aluminum phosphate (or SALP) was first disclosed in the U.S. Pat. No. 2,550,490, and an early baking powder composition incorporating SALP was disclosed in U.S. Pat. No. 2,550,491. U.S. Pat. No. 2,550,490 specifically discloses a SALP with a Na:Al:PO4 mole ratio of 1:3:8 (hereinafter 1:3:8 SALP). Since that time, several modifications of sodium aluminum phosphate have been developed which give different reactivities and performance characteristics. These include a dehydrated SALP, U.S. Pat. No. 2,957,750; a 3:3:8 SALP, U.S. Pat. No. 3,223,479; a 3:2:8 SALP U.S. Pat. No. 3,501,314; a 2:3:6 SALP, U.S. Pat. No. 3,574,536; an amorphous SALP, U.S. Pat. No. 2,995,421; a 3:3:9 SALP, U.S. Pat. No. 3,726,962 and a continuous crystallization of SALP, U.S. Pat. No. 3,311,448. The SALP's of commerce include a 1:3:8 SALP and 3:2:8 SALP.

Several proposals have been made in the past for improving the properties of sodium aluminum phosphate, particularly the flow characteristics and dust properties.

In U.S. Pat. No. 3,205,073, there is provided a potassium modified sodium aluminum acid phosphate having decreased hygroscopicity. This result is accomplished by modifying the original sodium aluminum phosphate molecule before, during or after preparation with the introduction of potassium. An improvement over U.S. Pat. No. 3,205,073 is U.S. Pat. No. 3,411,872, which attempts to improve the flow characteristics of the U.S. Pat. No. 3,205,073 potassium modified sodium aluminum phosphate by incorporating the potassium ions in a solvent suspension of an alkanol.

A further improvement in SALP is disclosed in U.S. Pat. No. 4,054,678 wherein a specific ratio of sodium and potassium is used to prepare a potassium modified SALP. The improved SALP product is characterized by increased density and reduced dusting properties.

A calcium treated SALP having improved handling characteristics and useful as a leavening agent in moist doughs and liquid batters is disclosed in U.S. Pat. No. 4,196,226. These products, as leavening acids, show improved holding and storage characteristics in moist doughs and liquid batters. Calcium sulfate has been added to SALP during manufacture as disclosed in U.S. Ser. No. 972,097, filed Dec. 21, 1978 now U.S. Pat. No. 4,260,591.

While 1:3:8 SALP is a well known leavening acid with no flavor problems, the use of 1:3:8 SALP in canned biscuits to replace the SAPP to overcome the flavor problem has not been successful. The leavening action of 1:3:8 SALP has been considered "too fast" for canned doughs. Under normal processing conditions, the use of 1:3:8 SALP leads to failure due to the bursting of cans caused by bacterial growth. Proper internal pressure cannot be maintained after refrigeration. SALP (slow acting) or 3:2:8 SALP, has been used in combination with SAPP at a 25/75 percent ratio of a refrigerated dough containing large amounts of solid shortening (U.S. Pat. No. 3,879,563). The biscuits are taught to be more of the homemade variety. Since the 3:2:8 SALP is slower acting than the other commercially available SALP, the 1:3:8 SALP, and since SAPP is known to be faster than either SALP, the combination of 3:2:8 SALP and SAPP does not provide teachings on how to overcome the problem of using 1:3:8 SALP in refrigerated canned doughs.

U.S. Pat. No. 2,957,750 discloses a dehydrated SALP. This patent teaches that the rate of reaction of 1:3:8 SALP and the solubility can be increased over that of commercial 1:3:8 SALP by removing from 3 to 4 waters of crystallization. Commercial 1:3:8 SALP of the formula $$NaAl_3H_{14}(PO_4)_8 \cdot 4H_2O$$

is heated at 80° to 200° C. until the desired dehydration has taken place. This product would be of less utility in canned refrigerated doughs due to its faster leavening rate.

It is also known that storage of refrigerated doughs causes another problem, the appearance of glass-like crystals in the dough. These are caused by the crystallization of the phosphates. While the crystals are harmless as far as the product is concerned, the customer does not know or accept this so that complaints on this problem are frequent.

SALP, acidic has also been blended with up to 10% of an edible salt yielding trivalent aluminum such as aluminum sulfate as disclosed in U.S. Pat. No. 3,041,177, the disclosure of which is incorporated herein be reference. A blend containing about 93.5% SALP, acidic (prepared by process of U.S. Pat. No. 4,054,678) and 6.5% aluminum sulfate is available from Stauffer Chemical Company under the trademark BL-60.

Potassium sorbate can also be added as a dough conditioner. The potassium sorbate apparently decreases mixing time and apparently increases the storage stability of the dough product (see U.S. Pat. No. 3,556,798).

In U.S. Pat. No. 4,230,730 there is disclosed a new leavening acrd composition which can be used in leavening canned refrigerated dough comprising a potassium modified 1:3:8 sodium aluminum phosphate or the calcium modified derivatives thereof or mixtures thereof in combination with an alkali metal acid pyrophosphate. Unexpectedly, this leavening acid in combination with sodium bicarbonate produced gas at a rate slower than at least the fastest ingredient and, in many cases, slower than either leavening acid ingredient separately.

SUMMARY OF THE INVENTION

In accordance with the present invention, it has been found that a SALP leavening acid can be provided which is slow enough in rate for use in refrigerated doughs and which does not evidence the crystal problem upon storage prevalent in using past compositions. The leavening acid can also be effectively used to leaven pancake batters, especially those stored for hours in refrigerators prior to use. These leavening acids can be provided by heat treating a potassium modified 1:3:8 SALP at a temperature above 200° C. for a period of time sufficient to decrease the L.O.I. (loss on ignition) to between about 11% and 14% while maintaining a neutralizing value (determined by titration method) of above about 90 and a defined rate of reaction. These leavening acids can be used alone or in combination with SAPP for the desired leavening effect.

DETAILED DESCRIPTION OF THE INVENTION

The SALP which forms the basis of the invention is a 1:3:8 SALP of the formula $$MAl_3H_{14}(PO_4)_8 \cdot 4H_2O$$

wherein M is an alkali metal though products with fewer than 4 waters of crystallization can also be used.

As used herein the term 1:3:8 SALP is intended to be approximate. For example, the number one (1) can range between about 0.92 and about 1.08.

The SALP used in the invention is a potassium modified 1:3:8 SALP (hereinafter K-SALP) as it has been found that potassium-modified SALP dehydrates more easily than non-modified SALP. The potassium modified 1:3:8 SALP can be prepared in accordance with the process outlined in U.S. Pat. No. 4,054,678, the entire disclosure of which is incorporated herein by reference. It has been found that this potassium-modified SALP prepared in accordance with this process dehydrates more easily than non-potassium-modified SALP, provides a usable slow reaction rate vis-a-vis a non-potassium-modified SALP dehydrated to the same L.O.I. and may evidence increased stability. In accordance with this process, food grade phosphoric acid having a concentration of about 85.0 to about 88.0 weight percent $H_3PO_4$ is contacted with a sufficient amount of potassium ion to provide an analysis of about 0.5 to about 1.2 weight percent $K_2O$ in the final product, and a sufficient amount of sodium ion to provide an anlysis of from about 2.4 to about 3.2 weight percent of $Na_2O$ in the final product. This mixture is then treated with a sufficient amount of alumina to provide a concentration of from about 15% to about 17% by weight $Al_2O_3$ in the final product. The slurry thereby formed is cooled to a temperature within the range of from about 60° C. to about 75° C. The product is dried and granulated simultaneously. The product is ground and classified to obtain the following distribution:

On 60 mesh—from about 0.1% to about 5%
Through 50/On 100 mesh—from about 3% to about 20%
Through 100/On 140 mesh—from about 9% to about 50%

The product formed by this process is a potassium-modified SALP having the approximate formula:

$$Na_{a)}K_{b)}Al_3H_{14}(PO_4)_8 \cdot 4H_2O$$

wherein a) is a number within the range of from about 0.64 and about 0.72 and b) is a number within the range of from about 0.28 to about 0.36, the total of a) and b) being a number within the range of from about 0.92 to about 1.08.

The K-SALP can also be prepared using the modifications of U.S. Pat. No. 4,196,226 wherein a portion of the hydrated alumina has been replaced with an equivalent quantity of hydrated lime or U.S. Ser. No. 972,097 filed Dec. 21, 1978 now U.S. Pat. No. 4,260,591, wherein calcium sulfate is added to the K-SALP reactor slurry prior to granulation. The disclosures of these patents are incorporated herein by reference. The reference to K-SALP in the specification and claims is intended to include these modifications.

The K-SALP must be heat treated at a temperature above 200° C. and below about 260° C. and preferably at a temperature within the range of from about 210° C. to about 240° C. for a time sufficient to provide a product with an L.O.I. of between about 11% and about 14%. Preferably, the L.O.I. ranges from about 11.5% to about 13% and more preferably from about 11.5% and 12.5%.

The heating can be conducted in any apparatus which can provide the desired temperature. Agitation is desirable to provide uniform treatment. Temperatures above 200° C. and preferably ranging from about 210° C. to about 240° C. and more preferably ranging from about 215° C. to about 230° C. can be used. The duration of heating is dependent on the quantity being heated and the temperature of heating. The time needed to provide an L.O.I. in the desired range can be easily determined by a skilled artisan. The heating time generally ranges from about 60 to about 180 minutes. A heating time at the preferred temperature range varies from about 120 minutes to about 180 minutes (until the necessary L.O.I. is obtained). Examples of heating schedules include 150 minutes at 230° C. or 120 minutes at 240° C.

The heating is conducted for a period of time sufficient to provide the desired L.O.I. while maintaining the neutralizing value above (not allowing the value to fall below) 90. An upper limit is about 110 and preferably about 107. The neutralizing value, sometimes called neutralizing strength, of a leavening acid represents the number of kilograms of sodium bicarbonate which will be neutralized by 100 kilograms of the leavening acid. It is determined by titration of the acid and can be expressed:

$$NV = a/b \times 100$$

wherein a is the kilograms of sodium bicarbonate neutralized, and b is the kilograms of leavening acid required. The neutralizing value can be determined by blending 0.8401 grams sample acid, 20 grams NaCl, 5 milliliters of a 25% sodium citrate solution and 25 milliliters distilled water in a 375 milliliter white casserole. After immediately vigorously stirring the mixture for 30 seconds, 120 milliliters of 0.10 normal NaOH is added and the mixture heated to boiling (about 2 minutes). The solution is boiled for 5 minutes and while boiling but removed from the heat, 0.05 milliliters (0.25%) of phenolphthalein indicator is added. The solution is titrated with 0.2 normal HCl until the pink color almost disappears. The solution is boiled for one minute and titrated until the pink disappears. Neutralizing value is calculated as follows:

$$Ml\ 0.10\ NaOH - 2(Ml\ 0.2\ MCl) = N.V.$$

The literature reports a neutralizing value for SALP of 100.

It is important that the neutralizing value be maintained above 90. As heating is continued, the L.O.I. as well as the neutralizing value is decreased. If the value becomes too low there will be insufficient acid present to effect leavening. It has also been found that the neutralizing values determined by titration of the heated K-SALP do not properly reflect its neutralizing value in a leavening context. It is therefore important that the neutralizing value be maintained above 90.

The heated K-SALP compositions of the present invention are characterized by a baking powder rate of reaction slower than that of commercial 1:3:8 K SALP (as produced by U.S. Pat. No. 4,054,678 and sold as Levair by Stauffer Chemical Company.

The heated leavening acid is characterized by a baking powder rate of reaction (to be described hereinafter) of from about 15 c.c. to about 30 c.c. and preferably from about 16 c.c. to about 26 c.c. evolved $CO_2$ at 2 minutes, from about 18 c.c. to about 44 c.c. and preferably from about 18 c.c. to about 40 c.c. evolved $CO_2$ at 4 minutes and from about 20 c.c. to about 60 c.c. and preferably from about 24 c.c. to about 56 c.c. evolved $CO_2$ at 10 minutes. The change between the 2 minute rate and the 10 minute rate should be at least 7 c.c. of evolved $CO_2$.

Commercial 1:3:8 K-SALP·$4H_2O$ evolves about 46 c.c. $CO_2$ after 2 minutes, 59 c.c. after 4 minutes and 90 c.c. $CO_2$ after 10 minutes.

The heat treated K-SALP can be used alone or in combination with other leavening acids as desired. For canned refrigerated doughs, it is preferred that the heat treated SALP be used in conjunction with sodium acid pyrophosphate (SAPP). Since SAPP's with various rates are available, it is preferred to utilize a slow-acting SAPP having a 2 minute doughnut dough rate of reaction of less than about 30% evolved $CO_2$ and a 10 minute doughnut dough rate of reaction of less than about 35% evolved $CO_2$ as defined in U.S. Pat. No. 4,230,730, the disclosure of which is hereby incorporated by reference. By varying the rate of reaction of the SAPP, leavening acid compositions of varying rates can be formulated.

The acid pyrophosphate used in the present invention can be either sodium or potassium acid pyrophosphate and mixtures thereof. The preferred pyrophosphate for use in the invention is sodium acid pyrophosphate, though this usage is not intended to be so limited but only for purposes of explanation.

SAPP is prepared by the controlled thermal decomposition of monosodium phosphate. By varying the conditions of humidity and temperature as well as the amount of additives added and the particle size during processing, SAPP's of varying reactivities can be prepared. Most of the commercially prepared SAPP's contain added minor amounts of $K^+$, $Ca^{++}$, and $Al^{+++}$. These additives permit the controlled retardation of the rate of reaction of the SAPP with the sodium bicarbonate in the baking system. (See Phosphorus, A.D.F. Toy, ibid).

The potassium-modified SALP is used in a ratio to the SAPP within the range of from about 3:1 to about 1:3. Preferably the ratio of within the range of from about 1.5:1 to about 1:1.5. Most preferably for refrigerated canned doughs, the ratio is 1:1. Other ratios may be more effective in other baking applications. Variation in the ratios are also possible depending on such factors as the reaction rate of the potassium-modified SALP, and the amount of potassium present, as well as the reaction rate of the SAPP. These factors can be easily determined by one skilled in the art. The ratios are based on the titratable neutralizing value of SAPP and of the potassium-modified SALP leavening acids. The amount of SAPP is also governed by its neutralizing value of 72.

The leavening acid compositions (blends of heated SALP and SAPP) of the present invention can be formed by dry blending the potassium-modified SALP and the SAPP. This insures the intimate association of the materials. Flow control agents such as tricalcium phosphate can also be added. The compositions can also be prepraed in situ in the baked goods by blending the potassium-modified SALP and the SAPP with the flour and other ingredients of the baked good.

The leavening acid compositions (heated SALP alone or blended with SAPP) of the present invention can be used to leaven any baked product presently using SALP or SAPP. In particular, the leavening acid system of the present invention can be used to replace, on a one for one basis, the SAPP presently used in baking applications such as biscuits, pancakes, cakes and the like. The gas producing agent used in the formulations is generally sodium bicarbonate.

The procedure for preparing the baked goods using the leavening acids of the present invention can be the standard procedures normally connected with that product.

Illustrative of baked goods which can benefit from the leavening systems of the present invention are biscuits, doughnuts, cakes, pancakes, sweet doughs and the like and mixes used in their preparation. The preferred areas of use include biscuits and pancakes. The leavening compositions of the present invention are particularly advantageous for use in canned refrigerated biscuits which require a low gas generation during mixing and canning, the ability to develop pressure to seal the can upon proofing and the ability to maintain the pressure in the can under refrigeration. These requirements can be met by the leavening acid compositions and systems (blends of heated K-SALP or SAPP) of the present invention.

Biscuits are generally prepared from flour, sugar, salt, shortening, a leavening system of alkaline bicarbonate such as sodium or potassium bicarbonate and a leavening acid, water and optionally, milk solids. Additional components in minor amounts can include flavor and color agents, nutrient supplements, preservatives, antioxidants and reducing agents. In addition to the leavening acids of the present invention, small amounts of other leavening acids can be added to further provide for a wide range of leavening activity for any use desired. Illustrative acids suitable for such use in the biscuits include glucono delta lactone, sodium aluminum phosphate hydrate, sodium aluminum phosphate anhydride, anhydrous monocalcium phosphate, monocalcium phosphate monohydrate, monosodium phosphate, alpha-glucoheptonogamma-lactone, mixtures thereof and the like. These additives are also useful in areas other than biscuits where the present invention finds utility. Any other ingredients normally used in biscuits can be incorporated as desired.

The K-SALP of the invention can also be blended with other materials such as tricalcium phosphate for flow control as in commercial Levair. It is preferred to heat treat the K-SALP prior to the addition of the tricalcium phosphate since the blend requires longer times for heating. The K-SALP can also be blended with ingredients known to be usable in SALP leavening systems such as aluminum sulfate (U.S. Pat. No. 3,041,177) or monocalcium phosphate as in U.S. Pat. No. 3,109,738. K-SALP products prepared with added calcium as shown in U.S. Pat. No. 4,196,226 and calcium sulfate as in U.S. Pat. No. 4,260,591 can also be effectively treated in accordance with the invention.

The present invention will be more fully illustrated in the examples which follow.

Footnote references in the examples all relate to the same footnote which is defined at the point of first reference.

EXAMPLE 1

Potassium-modified SALP was statically heated in a forced convection airflow laboratory drying oven for various times at various temperatures. The times, temperatures, neutralizing values, L.O.I.'s and rates of reaction are reported in Table I hereinafter.

Loss on ignition was determined by weighing the sample, firing the sample in an 800° C. oven for 30 minutes and weighing again. The percentage loss in weight is the L.O.I.

The rates of gas release of the leavening systems of the invention in biscuit dough were evaluated in a baking powder rate of release test as outlined hereinafter.

The baking powder rate of reaction is determined by the following procedure:
1. Transfer 1.60 grams of a blend of 0.75 grams sodium bicarbonate and 0.85 grams redried starch to a dry 100 milliliter Soxhlet flask.
2. Add 0.74 grams of the K-SALP to be tested to the flask.
b 3. Fasten the flask, tightly stoppered, to a shaker over water at 27° C. and allow the flask and contents to reach 27° C.
4. Place 10 milliliters of distilled water at 27° C. in a stoppered burette over the flask.
5. Close the system so that gas evolved will be read by an automatic pressure recorder.
6. Simultaneously start the shaker, a stop watch and open the stopcock of the burette.
7. Read and record the c.c.s of $CO_2$ evolved at 2, 4 and 10 minutes.

An alternative procedure involves the use of a Chittick apparatus and procedure as described in AACC method 12-10, Ceral Laboratory Methods, Compiled by the Committee on Revision, American Association of Ceral Chemists, Inc., 7th ed. with updates 1975, 1976 and 1978.

The pressure recorder is calibrated such that a reading of 140 on the recorder is equivalent to 130 milliliters of gas at 27° C. as measured in a Chittick apparatus.

The results are reported in Table I which follows.

TABLE 1

| | Heating | | | | Rate**-c.c. Evolved $CO_2$ | | |
|---|---|---|---|---|---|---|---|
| Ex. | Min. Time | °C. Temp. | NV* | % L.O.I. | 2 Min. | 4 Min. | 10 Min. |
| 1 | 60 | 230 | 109 | 14.0 | 77 | 91 | 110 |
| 2 | 90 | 230 | 109 | 13.3 | 24 | 37 | 54 |
| 3 | 120 | 230 | 107 | 12.8 | 22 | 28 | 41 |
| 4 | 135 | 230 | 103 | 12.1 | 19 | 24 | 34 |
| 5 | 180 | 230 | 101 | 11.6 | 18 | 20 | 26 |
| 6 Control (K-SALP) | — | | 103 | 20.1 | 46 | 59 | 90 |

*Neutralizing value
**Rates given are baking powder rates of reaction

EXAMPLE 7-14

Self-rising flour biscuits were prepared using the following formulation:
240 grams soft wheat flour
3.3 grams soda
4.2 grams leavening acid
5.4 grams salt
32 grams unemulsified shortening 165-175 milliliters milk The biscuits were prepared using the procedure disclosed in Example 1 of U.S. Pat. No. 4,283,435 with the exception that milk was used in place of water. The disclosure of this patent is hereby incorporated by reference. The biscuits were also evaluated in accordance with the procedures outlined therein. The following results were obtained.

TABLE 2

| | | | | Biscuits (80 N.V.) | | |
| --- | --- | --- | --- | --- | --- | --- |
| Ex. | Leavening Acid | N.V. | LOI | Height | Specific Val. | pH |
| 7 | Heated K-SALP* | 111 | 14.3 | 23.125 | 2.75 | 7.02 |
| 8 | Heated K-SALP* | 107.4 | 13.0 | 21.875 | 2.58 | 7.30 |
| 9 | Heated K-SALP (Ex. 4) | 103 | 12.1 | 21.25 | 2.52 | 7.63 |
| 10 | Heated K-SALP* | 103.2 | 12.0 | 22.5 | 2.57 | 7.64 |
| 11 | Heated K-SALP (Ex. 5) | 101 | 11.6 | 21.25 | 2.38 | 8.03 |
| 12 | K-SALP (Control) | 103 | 20.1 | 23.125 | 2.71 | 7.4 |
| 13 | K-SALP (Control) | 102.6 | 20.1 | 23.75 | 2.79 | 7.28 |
| 14 | 3:2:8 | 101 | 15.3 | 23.125 | 2.67 | 7.09 |

*Prepared in accordance with the procedure of Examples 1–6.

What is claimed is:

1. A method for preparing a leavening acid composition comprising heating a potassium modified 1:3:8 sodium aluminum phosphate at a temperature above 200° C. for a period of time sufficient to reduce the L.O.I. to within the range of from about 11 to about 14, said time being insufficient to reduce the neutralizing value of said phosphate below 90, said composition being characterized by a baking powder rate of reaction ranging from about 15 c.c. to about 30 c.c. evolved $CO_2$ at 2 minutes, from about 18 c.c. to about 44 c.c. evolved $CO_2$ at 4 minutes and from about 24 c.c. to about 60 c.c. evolved $CO_2$ at 10 minutes.

2. The method as recited in claim 1 wherein said potassium modified sodium aluminum phosphate, prior to reducing the L.O.I., is a composition of the approximate formula:

$$Na_{a}K_{b}Al_3H_{14}(PO_4)_8 \cdot 4H_2O$$

wherein a) and b) are numbers and the additive total of a) and b) is a number within the range of from about 0.92 to about 1.08.

3. The method as recited in claim 2 wherein a) is a number within the range of from about 0.64 to about 0.72 and b) is a number within the range of from about 0.28 to about 0.36.

4. The method as recited in claim 1 wherein said L.O.I. ranges from about 11.5% to about 13%.

5. The method as recited in claim 1 wherein said neutralizing value ranges from about 90 to about 110.

6. The method as recited in claim 1 wherein said rate ranges from about 16 c.c. to about 26 c.c. at 2 minutes and from about 24 c.c. to about 56 c.c. at 10 minutes.

7. The method as recited in claim 1 wherein said temperature ranges from about 210° C. to about 240° C.

8. The method as recited in claim 7 wherein the time ranges from about 60 minutes to about 180 minutes.

9. The leavening acid composition as produced by the method of claim 1.

10. The leavening acid composition as produced by the method of claim 2.

11. The leavening acid composition as produced by the method of claim 3.

12. The leavening acid composition as produced by the method of claim 4.

13. The leavening acid composition as produced by the method of claim 5.

14. The leavening acid composition as produced by the method of claim 6.

15. The leavening acid composition as produced by the method of claim 1 in combination with an alkali metal acid pyrophosphite in a ratio of 3:1 to 1:3.

16. The composition as recited in claim 15 wherein said alkali metal acid pyrophosphate has a doughnut dough ratio of reaction of less than 30% evolved $CO_2$ at 2 minutes and less than about 35% evolved $CO_2$ at 10 minutes.

* * * * *